(12) United States Patent
Xie et al.

(10) Patent No.: US 12,450,375 B2
(45) Date of Patent: Oct. 21, 2025

(54) 3D DATA SYSTEM, SERVER, AND METHODS OF HANDLING 3D DATA

(71) Applicant: VRC INC., Hachioji (JP)

(72) Inventors: Yingdi Xie, Hachioji (JP); Michiaki Goto, Hachioji (JP); Yazhen Wu, Hachioji (JP)

(73) Assignee: VRC INC. (JP)

( * ) Notice: Subject to any disclaimer, the term of this patent is extended or adjusted under 35 U.S.C. 154(b) by 313 days.

(21) Appl. No.: 17/639,436

(22) PCT Filed: Sep. 5, 2019

(86) PCT No.: PCT/JP2019/034919
§ 371 (c)(1),
(2) Date: Mar. 1, 2022

(87) PCT Pub. No.: WO2021/044568
PCT Pub. Date: Mar. 11, 2021

(65) Prior Publication Data
US 2022/0335144 A1 Oct. 20, 2022

(51) Int. Cl.
G06F 21/30 (2013.01)
G06F 21/62 (2013.01)
G06T 19/20 (2011.01)

(52) U.S. Cl.
CPC ......... G06F 21/6218 (2013.01); G06T 19/20 (2013.01); G06T 2219/024 (2013.01);
(Continued)

(58) Field of Classification Search
CPC ................ G06F 21/6218; G06T 19/20; G06T 2219/024; G06T 2219/2012; G06T 2219/2021
See application file for complete search history.

(56) References Cited

U.S. PATENT DOCUMENTS 10,895,913 B1 * 1/2021 Patel ................. G06F 3/014
2004/0002841 A1 1/2004 Mayuzumi et al.
(Continued)

FOREIGN PATENT DOCUMENTS

CN 102164133 A 8/2011
CN 102707910 A 10/2012
(Continued)

OTHER PUBLICATIONS

First Office Action for corresponding Chinese Application No. 201980100068.8 dated Jul. 15, 2022 with English translation (15 Pages).
(Continued)

Primary Examiner — Normin Abedin
(74) Attorney, Agent, or Firm — Harness, Dickey & Pierce, P.L.C.

(57) ABSTRACT

A 3D data system includes: a storage means that stores a correspondence, for each of a plurality of 3D data sets, each including a data body representing 3D model, share restriction information describing restrictions on a scope for sharing the data body, the process restriction information describing restrictions on the processing of the 3D model, the correspondence being among the data identifier of the 3D data set, the user identifier of a user who is a subject in the data body included in the 3D data set, and a user identifier of another user who shares the 3D data set from the user; a request receiving means that receives a processing request including a user identifier from the service application; an authenticating means that authenticates the user who has made the request performs the processing; and a response transmitting means that transmits at least a part of the data body and at least a part of the processing limit information to the service application.

8 Claims, 10 Drawing Sheets

(52) U.S. Cl.
CPC ............... *G06T 2219/2012* (2013.01); *G06T 2219/2021* (2013.01)

(56) References Cited

U.S. PATENT DOCUMENTS

| | | |
|---|---|---|
| 2004/0252186 A1 | 12/2004 | Mashitani et al. |
| 2011/0246572 A1 | 10/2011 | Kollenkark et al. |
| 2012/0218609 A1 | 8/2012 | Kota |
| 2012/0299915 A1 | 11/2012 | Eluard et al. |
| 2014/0325229 A1 | 10/2014 | Bacastow |
| 2015/0007281 A1* | 1/2015 | Omae ............... H04L 9/3231 726/5 |
| 2016/0026823 A1 | 1/2016 | Kollenkark et al. |
| 2018/0350156 A1 | 12/2018 | Tsukikawa |
| 2019/0205563 A1 | 7/2019 | Gonzales, Jr. |
| 2019/0213311 A1* | 7/2019 | Tussy ............... G06V 10/17 |
| 2019/0378341 A1* | 12/2019 | Xie ............... H04N 21/8146 |
| 2020/0320080 A1* | 10/2020 | Almasan ............... G06F 16/903 |
| 2022/0335144 A1 | 10/2022 | Xie et al. |

FOREIGN PATENT DOCUMENTS

| | | |
|---|---|---|
| EP | 2907073 B1 | 8/2015 |
| JP | 2003-186922 A | 7/2003 |
| JP | 2004-287857 A | 10/2004 |
| JP | 2005-208854 A | 8/2005 |
| JP | 2012-243319 A | 12/2012 |
| JP | 2014-010598 A | 1/2014 |
| JP | 2017-037586 A | 2/2017 |
| JP | 2017-146818 A | 8/2017 |
| JP | 6431584 B1 | 11/2018 |
| JP | 6489726 B1 | 3/2019 |
| JP | 6791530 B1 | 11/2020 |

OTHER PUBLICATIONS

International Search Report of the International Searching Authority issued in PCT/JP2019/034919 (English and Japanese), mailed Oct. 21, 2019; ISA/JP (4 pages).

Office Action for corresponding Japanese Application No. JP2020-180724 dated Sep. 27, 2022 with English translation (11 pages).

Office Action for corresponding Japanese Application No. JP2022-173636 dated Nov. 15, 2022 with English translation (15 pages).

Extended European Search Report issued in European Application No. 19944101.5 (PCT/JP2019/034919); Mailed Apr. 4, 2023; 12 pages.

* cited by examiner

| DATA ID | USER ID | AUTHGORIZATION ID |
|---|---|---|
| data011 | usr001 | usr002(2), usr102(3), usr103(1) |
| data012 | usr021 | Usr121(1), usr122(2), usr103(2), ⋯ |
| data013 | usr093 | null |
| ⋮ | ⋮ | ⋮ | ated, and the service application further includes a
3D DATA SYSTEM, SERVER, AND METHODS OF HANDLING 3D DATA

CROSS REFERENCE TO RELATED APPLICATIONS

This application is a U.S. National Phase Application under 35 U.S.C. 371 of International Application No. PCT/JP2019/034919, filed on Sep. 5, 2019. The entire disclosure of the above application is expressly incorporated by reference herein.

BACKGROUND

Technical Field

The present invention disclosure relates to data handling for 3D models.

Related Art

A technique is known by which a person, an article, or the like is photographed and converted into 3D data for use in a virtual space. For example, JP 6489726B discloses a technique for adding to 3D modelling data personality data indicative of personality dynamics of a subject.

In recent years, SNSs (Social Networking Services) have become popular. Sharing 3D modelling data via SNSs is likely to become widespread in the near future. However, 3D modelling data created from photographs of a user constitutes personal information, and if such data is used in a way that is not intended by a user who is a subject of a 3D model, the privacy of the user may be infringed.

The present invention provides a technique that enables a user to control processing of a 3D data set including a 3D model when the 3D data set is shared.

SUMMARY

According to one aspect of the invention, there is provided a 3D data system comprising, a server; a service application that provides services using data provided from the server; and a client terminal that provides a UI for the service application to a user, wherein the service application includes a request transmitting means that transmits a processing request to the server in response to an instruction input via the client terminal, the processing request including a request to process a 3D data set, a data identifier for identifying the 3D data set, and a user identifier for identifying a user, the 3D data set including a data body, share restriction information, and process restriction information, the data body representing a 3D model, the share restriction information describing restrictions on a scope of sharing the data body, the process restriction information describing restrictions on the processing of the 3D model, and the server includes a storage means that stores a correspondence among the data identifier of the 3D data set, the user identifier of a user who is a subject in the data body included in the 3D data set, and a user identifier of another user who has shared the 3D data set of the user, a request receiving means that receives the processing request from the service application, an authenticating means that authenticates processing relating to the processing request based on the correspondence stored in the storage means and the share restriction information included in the 3D data set, and a response transmission means that transmits at least a part of the data body and at least a part of the process restriction information to the service application in response to the processing request in a case that the processing is authenticated, and the service application further includes a response receiving means that receives the response from the server, a processing means that performs the processing on the data body within the restriction described by the process restriction information, and an output means that outputs data which causes the client terminal to output a result of the processing performed by the processing means.

The request receiving means may be configured to receive from the service application a share request, which is a request for sharing the 3D data set with another user, the share request including a user identifier of a share source user and of a share destination user, and the authenticating means may be configured to authenticate sharing of the 3D data set from the share source user to the share destination user based on the share restricting information stored in the storage means, and the 3D data system may further comprise a share means that causes the storage means to store information that the 3D data set has been shared from the share source user with the share destination user in a case that sharing the 3D data set from the share source user with the share destination user is authenticated.

The request receiving means may be configured to receive a change request, which is a request for changing a user with whom the 3D data set is shared, the change request including the identifier of the 3D data set and a user identifier that identifies the source user of the request, and in a case that the user identifier included in the change request is identical with the identifier of the user who is the subject in the data body included in the 3D data set, the share means changes the share destination user stored in the storage means.

The processing request may include a use identifier that identifies a use of the 3D data set, the response transmission means is configured to transmit a response to the service application, the response including a part of the data included in the data body selected according to the use identifier.

The request transmitting means, the response receiving means and the processing means may be provided as an SDK (software development kit).

The server may include a fee charging means that charges a license fee for the SDK based on a number or frequency of reception the processing request from the service application.

The processing means may be configured to edit the 3D model, and the 3D data system may further comprise a data transmission means that transmits edit data representing content of the editing to another client terminal via a path different from that of the server.

According to another aspect of the invention, there is provided a server comprising, a storage means that stores, for each of a plurality of 3D data sets, a correspondence between a user who is a subject of a 3D model and another user with whom a 3D data set is shared, the plurality of 3D data sets including a data body, share restriction information, and process restriction information, the data body representing a 3D model, the share restriction information describing restrictions on sharing the data body, and the process restriction information describing restrictions on processing the 3D model; a receiving means that receives from a service application a processing request, which is a request to process the 3D data set, and includes a user identifier; an authenticating means that authenticates the user who sent the processing request, to perform the process based on the correspondence stored in the storage means and the share restriction information included in the 3D data set; and a transmission means that transmits at least a part of the data body and at least a part of the process restriction information to the service application in response to the processing request in a case that the user who sent the processing request is authenticated to perform the processing.

According to yet another aspect of the invention, there is provided a 3D data processing method comprising, transmitting, by a service application, a processing request to a server, the processing request being a request for processing a 3D data set, the 3D data set including a data body, share restriction information, and process restriction information, the data body representing a 3D model, the share restriction information describing a restriction on a scope for sharing the data body, the process restriction information describing a restriction on processing of the 3D model, the processing request including a data identifier for identifying the 3D data set and a user identifier for identifying a user; and storing, by the server, in the storage means a correspondence among the data identifier of the 3D data set, a user identifier of a user who is a subject in the data body included in the 3D data set, and a user identifier of a user who shares the 3D data set of the user; receiving, by the server, the processing request from the service application; authenticating, by the server, to perform the processing related to the processing request based on the correspondence stored in the storage unit and the share restriction information included in the 3D data set; transmitting, by the server, in response to the processing request, at least a part of the data body and at least a part of the process restriction information to the service application, in a case that the processing is authenticated; receiving, by the service application, the response from the server; processing, by the service application, the data body within the restrictions of the process restriction information; and outputting, by the service application, at the client terminal a result of the processing.

Advantageous Effects of the Invention

The present invention enables a user to control processing of a 3D data set when the 3D data set includes a 3D model that is shared.

DESCRIPTION OF REFERENCE NUMERALS

1 . . . 3D data system, 2 . . . communication line, 10 . . . request transmission means, 12 . . . response receiving means, 13 . . . processing means, 14 . . . data transmission means, 20 . . . server, 21 . . . storage means, 22 . . . request receiving means, 23 . . . authenticating means, 24 . . . response transmitting means, 25 . . . sharing means, 26 . . . fee charging means, 27 . . . data transmission means, 101 . . . processor, 102 . . . memory, 10 . . . communication IF unit, 201 . . . memory, 203 . . . Storage, 204 . . . Communication IF.

DETAILED DESCRIPTION

1. Configuration

Figure 1:
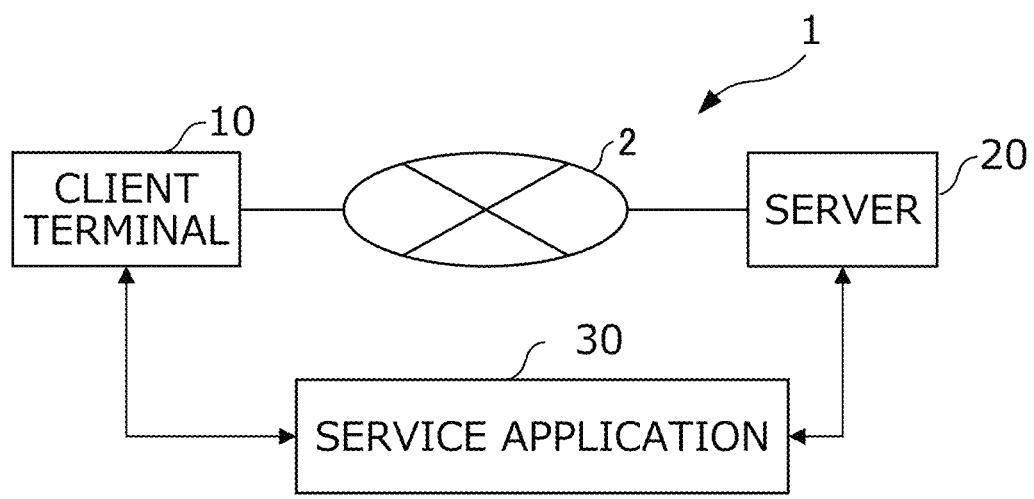
FIG. 1 is a diagram showing an outline of 3D data system 1 according to one embodiment.

FIG. 1 is a diagram illustrating an overall exemplary configuration of 3D data system 1 according to one embodiment. 3D data system 1 is a system that provides to an application a 3D data set that represents a 3D model. A 3D model includes data for representation of stereoscopic data in a three-dimensional virtual space. A 3D model at least includes information showing a surface geometry of a 3D subject and a color of the surface. A 3D data set is generated, for example, by using images of the surface of the subject. The term "subject" refers to an object for which a 3D data set is generated, and includes living beings such as humans and animals, and inanimate things such as dolls, clothing, and furniture.

3D data system 1 includes a client terminal 10, a server 20, and a service application 30. Service application 30 is software (or a program) for providing a service utilizing 3D data to a user. The service application 30 may be implemented in any hardware device and, in one example, is a web application implemented in a server different to and separate from server 20. Alternatively, a part or all of service application 30 may be implemented in client terminal 10. Client terminal 10 is a terminal for providing a UI (User Interface) for service application 30, and is, for example, a smartphone, a tablet device, a laptop computer, or a computer such as a gaming machine. Server 20 is a so-called cloud server, and stores a plurality of 3D data sets, reads a 3D data set from the storage unit in response to a request from service application 30, and provides the read 3D data set to service application 30. Client terminal 10 is connected to server 20 via a communication line 2, which includes, for example, the Internet, a mobile communication network, a telephone line, or a LAN (Local Area Network).

Software such as an operating system (hereinafter referred to as an "OS") and an application program is installed in the client terminal 10, and the installed application is used by a user. In particular, an application utilizing a 3D data set is installed in client terminal 10. Although a single client terminal 10 is shown in FIG. 1 for simplicity of illustration, plural client terminals 10 may be included in 3D data system 1.

Figure 2:
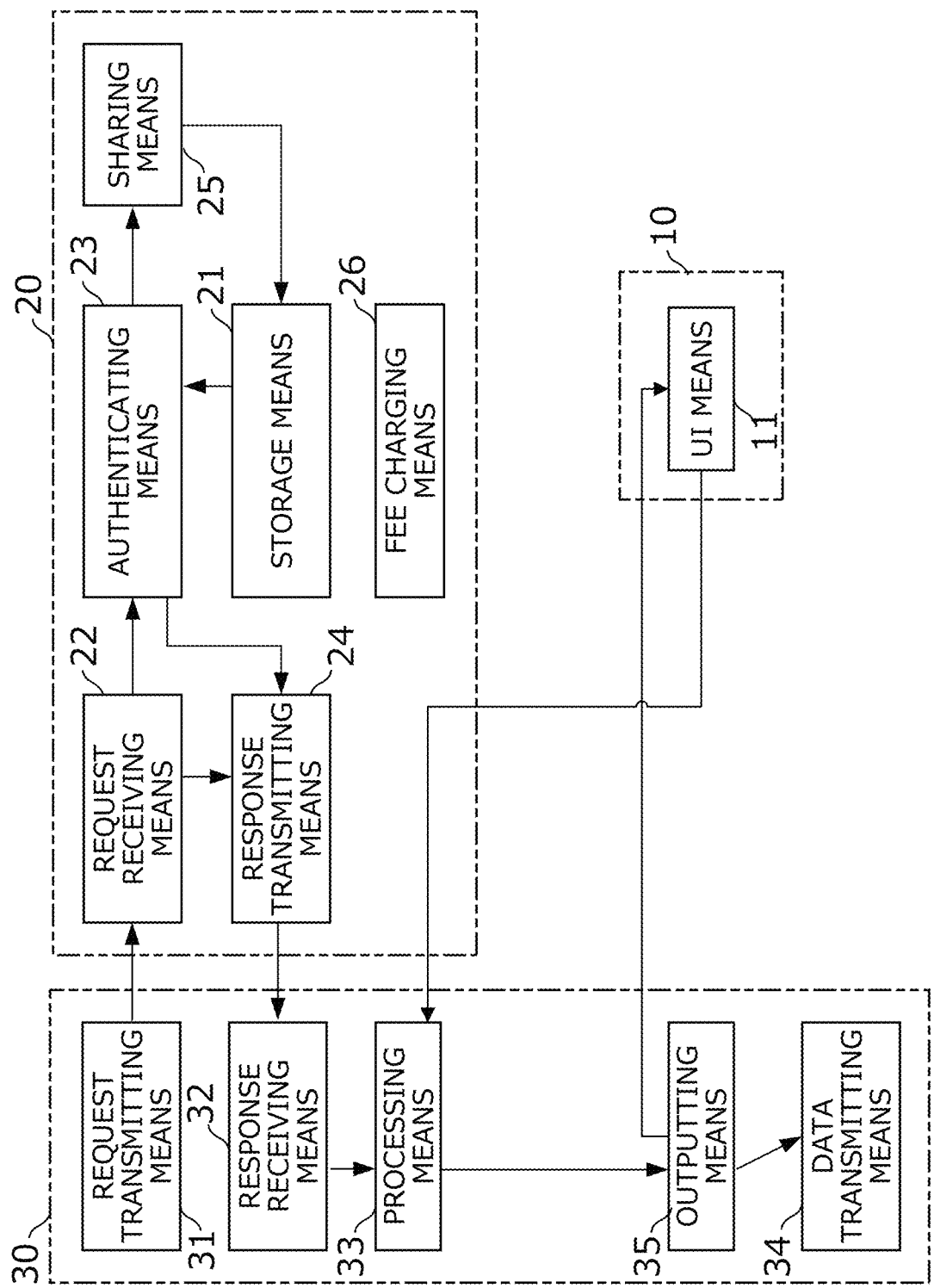
FIG. 2 is a diagram illustrating a functional configuration of 3D data system 1.

FIG. 2 is a diagram illustrating an exemplary functional configuration of 3D data system 1. 3D data system 1 includes a request transmitting means 31, a response receiving means 32, a processing means 33, a data transmitting means 34, an outputting means 35, a storage means 21, a request receiving means 22, an authenticating means 23, a response transmitting means 24, a sharing means 25, a fee charging means 26, and a UI means 11.

In server 20, storage means 21 stores a database for a 3D data set. The database records a correspondence among a data identifier of the 3D data set, a user identifier of a user (or modeled user) who is a subject in the data body contained in the 3D data set, and user identifiers of users who share the 3D data set of the user. Further, the database records a data body representing a 3D model, share restriction information describing restriction on a scope of a scope for sharing the database, and process restriction information describing restrictions on processing the 3D model. It is of note that some data such as the data body can alternatively be recorded in an external database. The 3D data set is generated, for example, by a 3D scanner (not shown in the figures). A 3D scanner is a device that reads a surface geometry and a color of a surface of a subject to produce a 3D data set.

In service application 30, request transmitting means 31 transmits to server 20 a processing request for a 3D data set. The processing request includes a data identifier that identifies the 3D data set and a user identifier that identifies a user. For example, service application 30 transmits a processing request in response to an instruction input by the user via UI means 11 at client terminal 10. UI means 11 provides a user interface to the user.

At server 20, request receiving means 22 receives a processing request from service application 30. Authenticating means 23 authenticates execution of processing of processing requests based on correspondences stored in storage means 21 and on share restriction information included in the 3D data set. If the processing is authenticated, response transmitting means 24 transmits at least a part of the data body and at least a part of the process restriction information to service application 30 in response to the processing request.

In service application 30, response receiving means 32 receives a response from server 20. Processing means 33 performs processing on the data body within a scope described by restrictions in the process restriction information. Output means 35 outputs data for outputting (e.g., displaying) a result of processing in processing means 33 at client terminal 10. If the processing by processing means 33 is for editing a 3D model, data transmitting means 34 transmits edit data indicating a content of the editing to another client terminal 10 via a path different from that of server 20, for example.

If the processing request transmitted from service application 30 is related to sharing of 3D data, and authentication to share the 3D data set is provided from a share source user to a share destination user(s), sharing means 25 stores in storage means 21 information that the 3D data set is shared from the share source user to the share destination user(s). Fee charging means 26 charges a license fee for the SDK based on a number or frequency of reception of the processing request from client terminal 10.

In this example, request transmission means 31, response receiving means 32, processing means 33, and data transmission means 34 are each functions of service application 30. As mentioned above, these functions may be implemented in any appropriate hardware. In one example, all of these functions are implemented in client terminal 10. In another example, all of these functions are implemented in a server separate from and different to server 20. In yet another example, some of these functions are implemented in client terminal 10 while some are implemented at the server device.? Storage means 21, request receiving means 22, authenticating means 23, response transmission means 24, share means 25, and accounting means 26 are implemented at server 20. Such allocation of functions among client terminal 10 and server 20 is merely an example, and allocation of functions is not limited to the example shown in FIG. 2.

Figure 3:
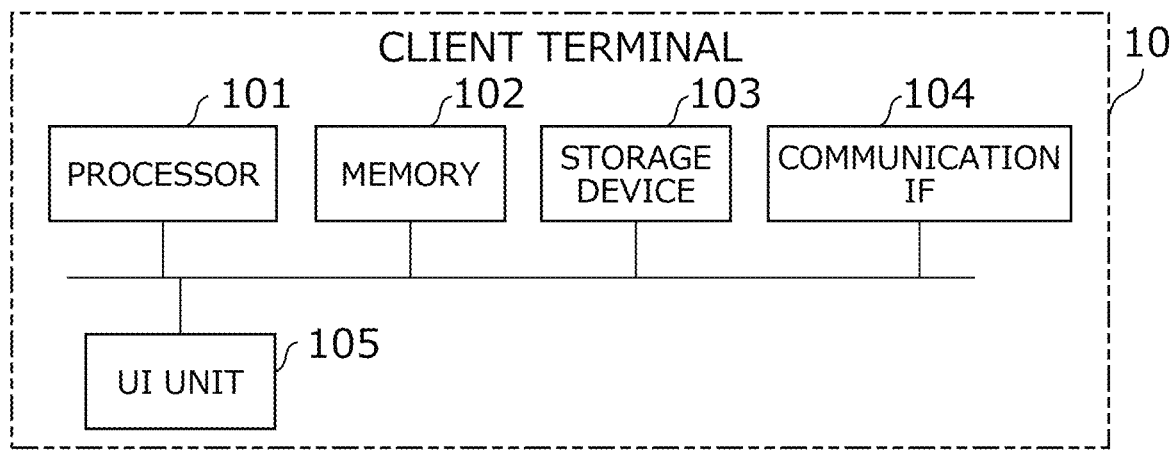
FIG. 3 is a block diagram illustrating a hardware configuration of client terminal 10.

FIG. 3 is a block diagram illustrating an exemplary hardware configuration of client terminal 10. A processor 101 is a processor that controls elements of client terminal 10. A memory 102 is a storage device that functions as a work area for processor 101 to execute a program, and includes, for example, a RAM (Random Access Memory). A storage device 103 is a storage device for storing various programs and data, and includes, for example, an SSD (Solid State Drive) or a HDD (Hard Disk Drive). A communication IF 104 is an interface for performing communication in accordance with a predetermined communication standard (e.g., TCP/IP), and includes, for example, an NIC (Network Interface Card). UI unit 105 includes, for example, a touch screen and keys. UI unit 105 may be integrated in client terminal 10, or may be externally connected.

In this example, storage device 103 stores an OS program and other application programs. The function shown in FIG. 2 is implemented by processor 101 reading and executing a program stored in storage device 103. Processor 101 and/or communication IF 104 executing the program is an example of request transmission means 31, response receiving means 32, and data transmission means 34. Processor 101 executing the program is an example of processing means 33.

Figure 4:
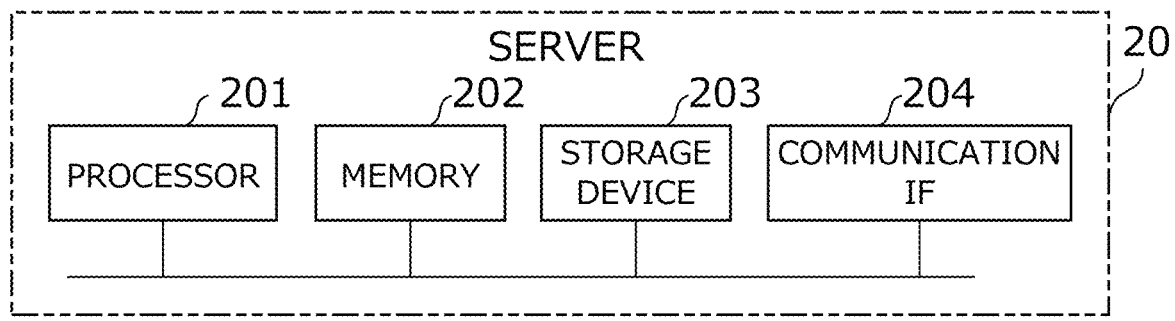
FIG. 4 is a block diagram illustrating a hardware configuration of server 20.

FIG. 4 is a block diagram illustrating an exemplary hardware configuration of server 20. A processor 201 is a processor that controls elements of server 20. A memory 202 is a storage device that functions as a work area for the processor 201 to execute a program, and includes, for example, a RAM (Random Access Memory). A storage device 203 is a storage device for storing various programs and data, and includes, for example, an SSD (Solid State Drive) or an HDD (Hard Disk Drive). A communication IF 204 is an interface for performing communication in accordance with a predetermined communication standard (e. g, TCP/IP), and includes, for example, an NIC (Network Interface Card).

In this example, the function in FIG. 2 is implemented by processor 201 executing a computer program stored in storage device 203. Storage device 203 is an example of storage means 21. Processor 201 and/or communication IF 204 executing the program is one example of request receiving means 22 and response transmitting means 24. Processor 201 executing the program is an example of authenticating means 23, share means 25, and accounting means 26.

Figure 5:
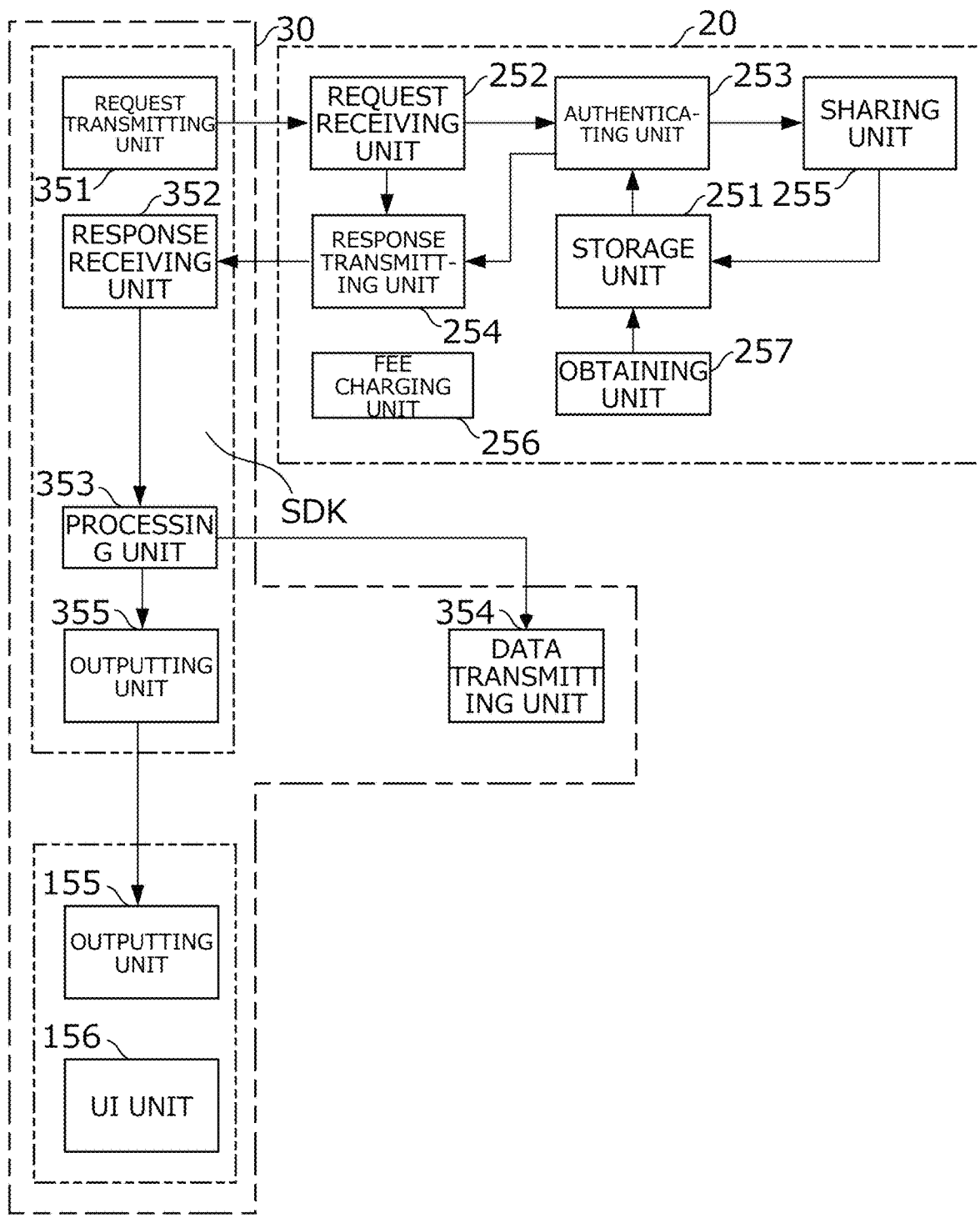
FIG. 5 is a block diagram illustrating a software configuration of 3D data system 1.

FIG. 5 is a block diagram illustrating an exemplary software configuration of 3D data system 1. In this example, service application 30 is partially implemented at a server (not shown in the figures) on a network. Specifically, request transmitting unit 351, response receiving unit 352, processing unit 353, data transmitting unit 354, and output unit 355 are implemented [provided] at the server, while another part, specifically, the display control unit 155 and the UI unit 156 are implemented [provided] at the client terminal 10. Service application 30 provides the user with services utilizing a 3D data set. Service application 30 is, for example, an application that provides ID cards, business cards, virtual communications, video games, clothes fitting, measuring, virtual theaters, fitness, medical care, and movie production.

The ID card application is an application used to identify a user. On the ID card, a 3D model is displayed instead of a user's photograph. The business card application is an application for communicating a user's personal information to other users. The business card data includes a user's 3D data set. For example, the business card data of user Ua is output to another user Ub. User Ub can view business card data including a 3D model of user Ub at his or her client terminal 10.

The virtual communication application is an application for communicating with other users in a virtual space. In the virtual space, each user is displayed by use of a so-called avatar. According to the present embodiment, 3D models are used as avatars. By using the virtual communication application, for example, multiple users at remote locations can hold a meeting.

According to the present embodiment, in the video game, 3D models are used as characters appearing in a video game. For example, in fighting games, players can use their 3D models as player characters. The clothes fitting application is an application by which clothes are fitted on a human body model in a virtual space. According to the present embodiment, as a human body model, a 3D model is used. The human body model moves in the virtual space dressed in clothes (a so-called runway walk). The measuring application is an application that measures a size of a subject's body, e.g., height, chest circumference, torso circumference, etc.

The virtual theater application is an application for causing a virtual character (or avatar) to perform a performance (e.g., singing, playing, dancing, etc.) in a virtual space, and for watching the performance. The demonstration is performed, for example, on a stage in the virtual space. Users can watch the demonstration taken by a virtual camera. A position of the virtual camera (or viewpoint) is controlled, for example, in accordance with an instruction from a user. Users can bring virtual cameras to a specific performer, take a bird's-eye view of the stage, and freely control positions of virtual cameras.

The fitness application is an application for recording 3D models of the subject before and after exercise. By comparing the stored 3D models, it is possible to visually confirm a part where muscle is strengthened by the exercise and a part where excess fat is reduced. The medical care application is an application that 3D models and records the subject's body both before and after treatment. By comparing stored 3D models, effects of treatment, medication, and rehabilitation can be visually confirmed. The movie production application is an application that brings 3D models into motion pictures.

The service application 30 includes a request transmitting unit 351 (an example of request transmitting means 31), a response receiving unit 352 (an example of response receiving means 32), a processing unit 353 (an example of processing means 33), a data transmitting unit 354 (an example of data transmitting means 34), and an output unit 355 (an example of output means 35). Request transmitting unit 351 transmits to server 20 a processing request for a 3D data set including a data body representing a 3D model, share restriction information describing restrictions on a scope in which the data body is shared, a data identifier for identifying a 3D data set including process restriction information describing restrictions on processing of a 3D model, and a user identifier for identifying a user. Response receiving unit 352 receives a response from server 20. Processing unit 353 performs processing on the data body within the scope of the restrictions based on the process restriction information. Output unit 355 outputs data for outputting (e.g., displaying) results of processing by processing unit 353 at client terminal 10. When processing performed by processing unit 353 is editing of 3D models, data transmitting unit 354 transmits the edit data indicating a content of the editing to another client terminal 10 via a route different from that of server 20.

Request transmitting unit 351, response receiving unit 352, processing unit 353, and output unit 355 are provided to a developer of service application 30 as a SDK. The developer of service application 30 develops service application 30 using the provided SDK. Display control unit 155 displays 3D modeling. For example, display control unit 155 displays a 3D model on UI unit 156 in accordance with movement of the programmed 3D model (e.g., an action of dancing of game characters) or movement from the viewpoint of virtual cameras.

Processor 201 executes the computer program stored in storage device 203, whereby request receiving unit 252 (an example of request receiving means 22), authentication unit 253 (an example of authenticating means 23), response transmitting unit 254 (an example of response transmitting means 24), sharing unit 255 (an example of share means 25), fee charging unit 256 (an example of accounting means 26), and obtaining unit 257 of FIG. 5 are implemented at server 20.

Storage unit 251 is an example of storage means 21. Storage unit 251 stores correspondences among a data identifier of the 3D data set, a user identifier of a user who is a subject in the data body included in the 3D data set, and a user identifier of a user who shares the 3D data set of the user. Request receiving unit 252 receives a processing request from client terminal 10. Authentication unit 253 authenticates whether processing related to the processing requests is performed based on the correspondences stored in storage unit 251 and the share restriction information included in the 3D data set. If the processing is authenticated, response transmission unit 254 transmits at least a part of the data body and at least a part of the process restriction information to client terminal 10 in response to the processing request.

When authentication to share the 3D data set is provided from the share source user to the share destination user, sharing unit 255 stores in storage unit 251 information that the 3D data set is shared by [from] the share source user with the share destination user. Fee charging unit 256 charges a license fee for the SDK in response to the processing request received from client terminal 10, for example, based on a number or frequency of reception of processing requests. Obtaining unit 257 obtains the 3D data set and stores it in storage unit 251.

Storage unit 251 stores a 3D database and a share database. In the 3D database, a 3D data set is stored in association with an identifier (or data ID) that identifies the 3D data set and an identifier (or user ID) that identifies a user who is a subject in the data body included in the 3D data set. The share database stores, for each of 3D data sets, information indicating which users have shared (which users are allowed to use) the 3D data set.

Figures 6, 7:
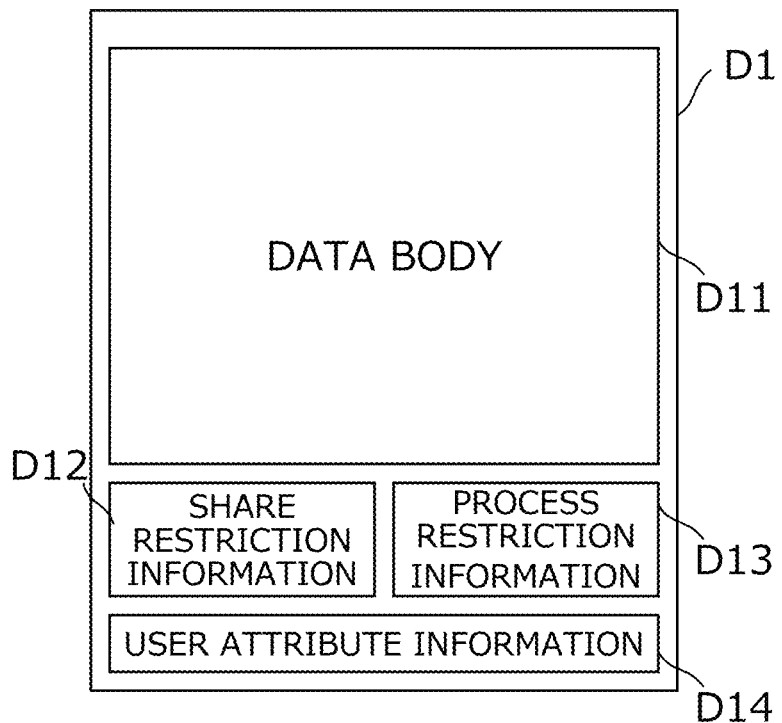
FIG. 6 is a diagram illustrating content of a 3D data set.
FIG. 7 is a diagram illustrating content of a share database.

FIG. 6 is a diagram illustrating content of 3D data set D1. (In the embodiment of) [As shown in] FIG. 6, 3D data set D1 includes a data body D11, share restriction information D12, process restriction information D13, and user attribute information D14. Data body D11 is data (hereinafter referred to as "3D modelling data") representing a 3D model. The 3D modelling data includes, for example, skin data and bone data of the 3D model. The skin data is data representing three-dimensional shapes and colors of the surfaces of the subject that is the subject of a 3D model. The bone data is data representing virtual structures (or bones) that impart motions to a 3D model. User attribute information D14 is information indicating attributes of the user who is the subject of the 3D model. In one example, user attribute information D14 includes the user ID of the subject. User attribute information D14 may include attributes such as age, sex, occupation, and the like of the subject in place of or in addition to the user ID.

The skin data included in the 3D modelling data is generated, for example, as follows. First, in a data generating device such as a 3D scanner (not shown in the figures), an image of a target subject is captured by a camera. The target subject is shot by the camera in a predetermined pose. In addition to the captured image, the 3D scanner obtains an image (for example, an image of a pattern figure of infrared rays, (hereinafter, a "pattern image") for measuring a distance to the camera. The 3D scanner calculates a distance from the camera to each point in the pattern image, that is, a three-dimensional shape of the surface of the object using the pattern image, and pastes the captured image onto the calculated three-dimensional shape. Skin data is thus obtained.

The 3D scanner also obtains characteristic points from 3D modelling data. The characteristic points are, for example, so-called end points of bones in 3D models. To obtain end points the method described in JP 6489726B is used, for example. The 3D scanner calculates feature quantities indicating positional correspondences of a plurality of end points. Data representing a feature quantity relating to a feature point is used as bone data. Further, the 3D scanner receives, from a user who is a subject, inputs of attributes of the user, information on restrictions of shares, and information on restrictions of processes. Based on the input information, the 3D scanner generates user attribute information D14, share restriction information D12, and process restriction information D13. The 3D scanner records this information in a predetermined data format and generates a 3D data set D1. The 3D scanner uploads the generated 3D data set D1 to server 20.

Share restriction information D12 is information describing restriction on a scope of sharing the data body. The share restriction information includes, for example, information indicating "no restriction," "only primary share allowed," or "share not allowed." "No restriction" indicates that there is no restriction on sharing. "Only primary share allowed" indicates that sharing is allowed only when direct share is performed by a user who is the subject of 3D models represented by the data body. "Share not allowed" indicates that share is prohibited. The share restriction information can include information indicating an upper limit of a number of share users. Further, the share restriction information can include, for example, "only when the share destination is a woman," "only when the share source is a teenager," "only when the share destination user(s) resides in the same country as the subject," and the like, the restrictions pertaining to attributes of the subject, the share source, or the share destination user(s).

Process restriction information D13 is information describing restrictions relating to processing of 3D models. The process restriction information includes, for example, at least one of restrictions on a bone, restrictions on a virtual camera, restrictions on editing, and restrictions on an application. The restrictions on the bone are, for example, information on restricting a predetermined movement (or motion) or posture (or pose), and include, for example, information on prohibiting a specific pose. The restrictions on the virtual camera include information on restricting a position of the virtual camera when displaying the 3D model, and include information indicating that shooting from predetermined angles and/or directions is prohibited with respect to the 3D model, for example. The restrictions on editing include, for example, information on prohibiting dressing change processing or information on prohibiting editing of a specific portion (for example, changing a color of hair). The restrictions on the application include, for example, information on restricting the applications that can use the 3D data. Specifically, the restrictions include information on restricting a type of application or information on prohibiting a use in a particular application.

The 3D data set is not limited to those generated by a 3D scanner. If a 3D data set is generated by a device other than server 20, server 20 obtains the 3D data set, the data ID that identifies the 3D data set, and the user ID of the user that is the target of 3D model represented by the 3D data set by receiving them from the other device for storage in a 3D database.

FIG. 7 is a diagram illustrating the content of the share database. In the example shown in FIG. 7, the data ID, the user ID, and the authorization ID correspond to each other in the database. Of these items, an identifier (data ID) that identifies a 3D data set is stored in the "data ID" item. In the of "user ID" item, an identifier (user ID) is stored that identifies a user who is a subject in the data body included in the 3D data set. In the "authorization ID" item, the user ID (hereinafter, "authorization ID") of the user who shares the 3D data set is stored based on the user identified by the user ID stored in the "user ID" item. As described above, in the share database, correspondence among the data ID, the user ID, and the user ID of the user who shares the 3D data set is recorded.

Further, in this embodiment, in the "authorization ID" item of the share database, the user ID of the user who shares the 3D data set, and the information (e.g. a flag or the like) indicating the n-th share (e.g. primary share, secondary share, tertiary share, or the like) of the share database are stored in association with each other. "Primary share" refers to a share by a user who is the subject of a 3D model represented by the data body of the 3D data set. "Secondary share" refers to a share by a user who shares the 3D data set by the primary share and shares the 3D data set with other users, rather than direct sharing by the user who is the subject of 3D models represented by the data body of the 3D data set. "Tertiary share" refers to share of the 3D data set by a user who shares the 3D data set by the secondary share to yet another user. The same applies to the n-th order share (n is a natural number), which means that the 3D data set is shared through n users. That is, in addition to the user ID of the user with whom 3D data set is shared, the shared database stores information indicating how many orders of sharing the shared user shares. Referring to FIG. 7, the notation "usr002(2)" indicates that secondary shares are allowed for "user002."

2. Operation 2-1. Providing 3D Data Sets

Next, operation of 3D data system 1 is described. Here, the operation when the user uses his or her 3D data set in service application 30 is described. The user of client terminal 10 performs an operation to start service application 30 via UI unit 105. Client terminal 10 starts service application 30 in response to the user's operation. Service application 30 performs a process to obtain a 3D data set from server 20.

Figure 8:
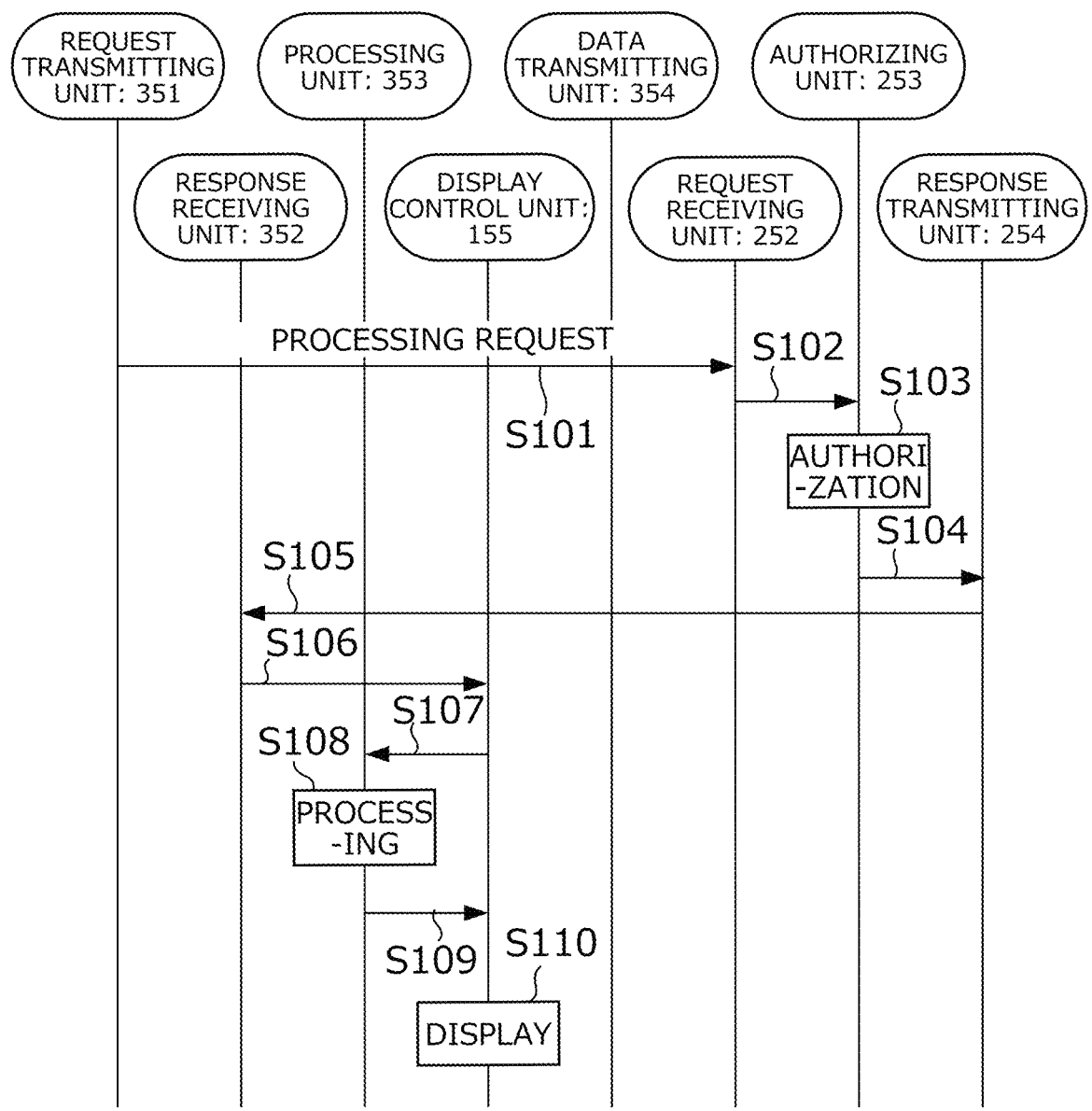
FIG. 8 is a sequence chart illustrating an operation of 3D data system 1.

FIG. 8 is a sequence chart illustrating an operation according to an embodiment of 3D data system 1. At step S101, request transmitting unit 351 transmits to server 20 a processing request for a 3D data set. Processing for a 3D data set includes, for example, outputting or editing a 3D model, or sharing a data set. The transmitted processing request includes a data ID (or data identifier) that identifies the 3D data set, a user ID (or user identifier) that identifies the user requesting the processing, a use identifier (e.g., all, skin data only, bone data only, etc.) that identifies the use (or a category) of 3D data set, and the content of the processing. In this operation example, description is given using an example in which the data ID is "data011," the user ID is "usr001," the use identifier is "all," and the content of the share database is illustrated in FIG. 7. At step S102, request receiving unit 252 provides the processing request received from client terminal 10 to authentication unit 253.

At the step S103, authentication unit 253 authenticates whether processing related to the processing request can be performed based on correspondence among the data ID, the user ID, and the authorization ID stored in the share database and the share restriction information included in the 3D data set. Here, the data ID "data011" and the user ID "usr001" included in the processing request are stored in correspondence with each other in the share database (see FIG. 7). Thus, authentication unit 253 allows the processing in the processing request to be performed. In another example, the processing request including the data ID "data011" and the user ID "usr121" is not allowed to perform processing in the processing request because the data ID "data011" and the user ID "usr121" do not correspond to each other in the share database.

If it is authenticated to perform the processing in the processing request, the authentication result is provided to the response transmitting unit 254 at step S104. At step S105, response transmitting unit 254 transmits at least a part of the data body and at least a part of the process restriction data included in the 3D data set to client terminal 10 in response to the process request received at step S101. In this operation example, response transmission unit 254 transmits a part (or all) of the data included in the data body selected according to the use identifier included in the processing request in response to client terminal 10. When the use identifier indicates all of the data body, response transmitting unit 254 transmits all of the data body included in the 3D data set and all of the process restriction information to client terminal 10. The transmitted data body and the process restriction data are received by reply receiving unit 352 at step S105. At step S106, reply receiving unit 352 notifies the display control unit 155 that the 3D data set has been received.

At step S107, display control unit 155 instructs processing unit 353 to execute processing on the 3D data set to display the 3D model. In this operation example, display control unit 155 inputs the parameter values relating to the display of the 3D model to processing unit 353 in accordance with movement of the bone of the 3D model, which is programmed in advance (or specified by the user), or movement of a viewpoint of the virtual camera. The parameter values relating to representation of 3D models are, for example, positional correspondences of bone or coordinates of viewpoints of virtual cameras.

In service application 30, the 3D model is placed in a virtual space. A viewpoint (or virtual camera) is defined in the virtual space. Service application 30 displays on UI unit 105 a two-dimensional image (obtained by the virtual camera) viewed from the defined viewpoint in the virtual space. The coordinates and orientation of the defined viewpoint in the virtual space can be specified by the user, for example, or can be automatically set in accordance with preset information or an algorithm, for example. In the latter case, coordinates and orientation of the defined viewpoint may be dynamically changed.

At step S108, processing unit 353 performs processing on received data of a main body within a scope of restrictions based on received process restriction information, and outputs the processing result to display control unit 155 at step S109. For example, if the coordinates of the viewpoint of the virtual camera are input, processing unit 353 generates an image (two-dimensional) of a 3D model as viewed from the defined viewpoint and outputs the generated image. Further, for example, if the positional relation (i.e., pose) of the bone is inputted, processing unit 353 generates an image (two-dimensional) in which 3D models of the pose are viewed from the defined viewpoint in the virtual space, and outputs the generated image.

At this time, if the positional correspondence or the like of the position and the bone of the viewpoint forbidden by the process restriction information is specified by display control unit 155, processing unit 353 outputs an error and does not generate the two-dimensional image. Alternatively, processing unit 353 can keep the position of the viewpoint or the positional correspondence of the bone within a scope allowed by the process restriction information, and may ignore the instruction to move them to a prohibited scope. Since the viewpoint set in the virtual space is virtual, service application 30 can set the view position and angle of the viewpoint. However, in this embodiment, the process restriction information restricts positions of viewpoints relative to 3D models. As a specific example, when dealing with a 3D model of a woman idol singer, for example, the virtual camera can be limited so as not to move below the waist of the 3D model, or the angle of view of the virtual camera can be limited so as not to move beyond a certain extent. In this way, the process restrictions limit the position of the viewpoint relative to 3D models. By use of this information, a process for a 3D model, e.g., an area that is not visible to the user can be defined for a 3D model.

At step S110, display control unit 155 performs processing such as display of the 3D model using the processed data body. For example, if service application 30 is an application that performs virtual communication, a user's three-dimensional avatar is displayed on UI unit 105 based on the received 3D modeling data, and the avatar communicates with other users in service application 30.

The processing performed by processing unit 353 using a 3D data set is not limited to displaying a 3D model. Processing unit 353 performs edit processing on a 3D model in accordance with user operations and the like. The edit processing for a 3D model is, for example, a process of changing a color of the hair of the 3D model, a process of changing a color of the skin, a process of changing a shape of facial features (eyes, nose, etc.) or a process of changing clothing. If editing a 3D model, processing unit 353 generates edit data indicating a content of the editing. If a 3D model is edited, processing unit 353 processes the 3D modeling data based on the content of the editing, and generates image data representing an image (two-dimensional) of the 3D model represented by the processed 3D modeling data (or data body). Processing unit 353 supplies the generated image data to display control unit 155, and stores the edit data representing the content of the editing in storage device 103. Display control unit 155 displays a two-dimensional image of 3D modeling on UI unit 105 in accordance with the image data provided from processing unit 353. The stored edit data is transmitted to another client terminal 10 when the 3D data is shared by another user. In this example, 3D modeling data stored in server 20 is not changed. The edit data is data indicating the content of the editing (for example, "change of color of skin to brown," "change of color of hair to black," etc.) with reference to the original data, and does not include the 3D modelling data.

2-2. Sharing Services for 3D Data Sets

The user of application 30 can share the processed 3D modeling data in service application 30 that is used by the user with other users who use service application 30. For example, if service application 30 is a program for displaying a movie of a dancing avatar, a user Ua who created the movie of the dancing avatar in service application 30 can share "the movie of the dancing avatar of user Ua" with a user Ub using the same service application 30. In particular, user Ua can share a 3D data set of his or her avatar and data indicating sequences of bone movements, i.e. choreography, of his or her dancing avatar. Share of 3D modelling data (or 3D data set) is limited by the share restriction data. Share restriction information is included in the 3D data set, as described above. In this operation example, an operation in which user Ua shares his or her 3D data set with another user Ub is described. In the following description, for the purpose of explanation, client terminal 10 used by user Ua is referred to as "client terminal 10a," and the client terminal 10 used by user Ub is referred to as a "client terminal 10b." User Ua performs operations for sharing a 3D data set using UI unit 105 of client terminal 10a. Service application 30 performs processing for sharing the 3D data set in response to the operation of user Ua.

Figure 9:
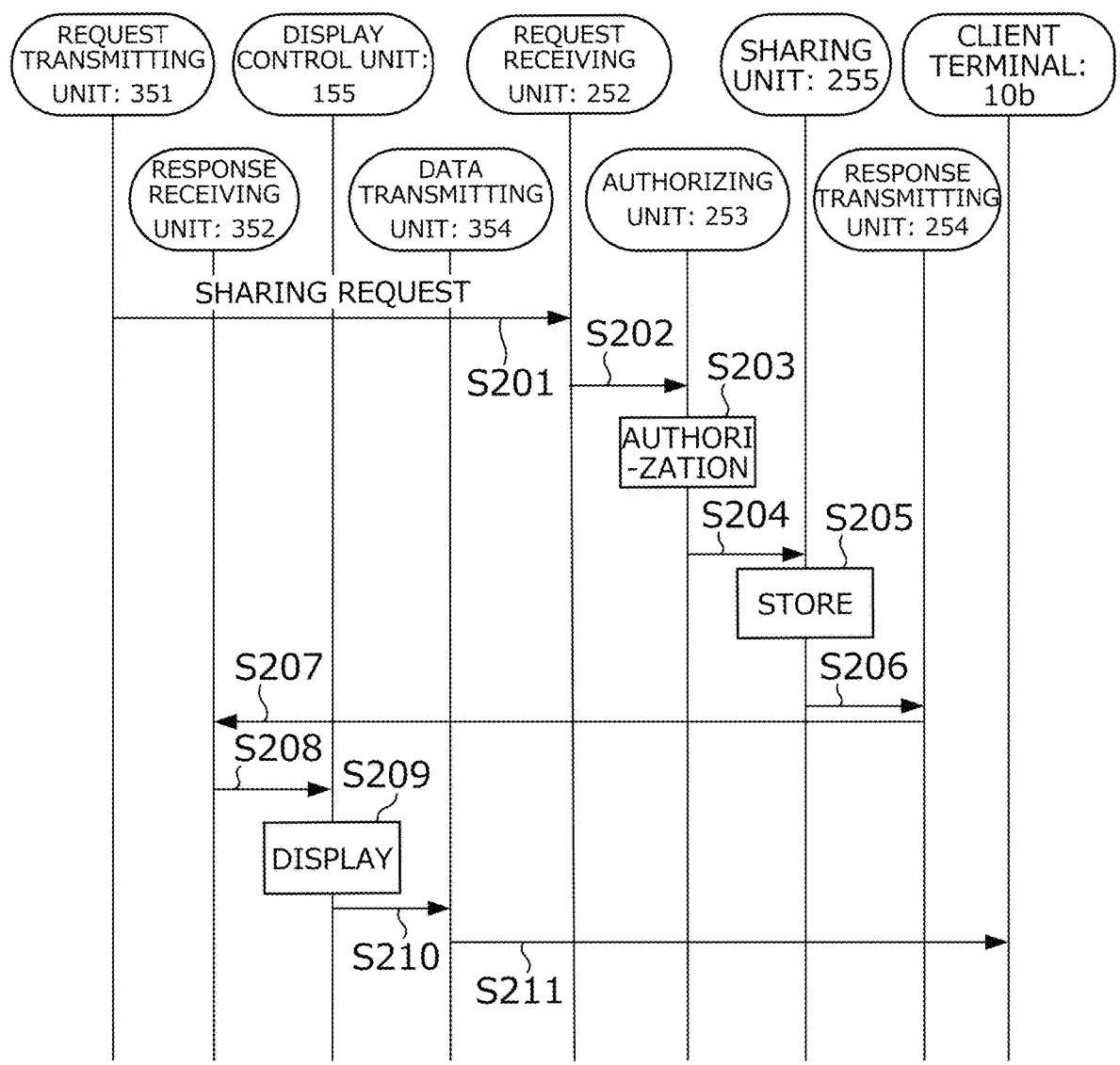
FIG. 9 is a sequence chart illustrating an operation of 3D data system 1.

FIG. 9 is a sequence chart illustrating operations relating to share of a 3D data set performed by 3D data system 1. At step S201, request transmitting unit 351 of service application 30 transmits to server 20 a request (share request) for sharing a 3D data set with other users. The share request includes the user ID of the share source user and the share destination user(s), as well as the data ID of the 3D data set to be shared. If the 3D data set can be identified without the identification information due to a restriction such as limit to one 3D data set per user, or a default 3D data set is set for each user, the share request may not include the data ID. For this operation example, an example will be described in which the user ID of the share source is "usr001," the user ID of the share destination is "usr002," and the share limit information included in the 3D data set to be shared is "only the primary share is allowed." Request receiving unit 252 receives a request from client terminal 10 at step S201. The received request is provided to authentication unit 253 at step S202.

At step S203, authentication unit 253 authenticates whether to execute the share request, that is, whether to share the 3D data set from the share source user with the share destination user(s), based on the share limit information stored in storage unit 251. Specifically, first, authentication unit 253 searches the user ID "usr001" of the share source user from the 3D database, and reads out the share restriction information included in the 3D data set corresponding to the user ID. In this example, since the share limit information included in the 3D data set as the share target is "only the primary share is allowed," authentication unit 253 allows the share of the share limit information to user Ub.

If it is authenticated to share the 3D data set from the share source user with the share destination user(s), the authentication result is transmitted to sharing unit 255 at step S204.

At step S205, sharing unit 255 stores in the share database information that the 3D data set has been shared from the share source user with the share destination user(s) in accordance with the authenticated result. Specifically, sharing unit 255 stores the data ID of 3D data set, the user ID of the share source user, and the user ID(s) of the share destination user(s) in the share database in association with each other. The result of the process by sharing unit 255 is provided to reply transmitting unit 254 at step S206.

At step S207, response transmitting unit 254 transmits a response indicating that the shares are authenticated in response to the request received at step S201. The response is received by response receiving unit 352 in service application 30. The content of the received reply is notified to display control unit 155 at step S209.

At step S209, display control unit 155 performs a process such as displaying that the sharing has been authenticated. If there is data (hereinafter, "related data") for which sharing has been instructed together with the 3D data set, display control unit 155 instructs data transmission unit 354 to transmit the related data (step S210). The related data may be, for example, data indicating the edited content of 3D data set or data indicating dancing. At step S211, data transmitting unit 354 transmits the related data to the another client terminal 10 (client terminal 10b). The path through which the related data is transmitted is different to that of server 20, and is, for example, a path through a server managed by the developer of service application 30. This allows relevant data to be shared by user Ub.

User Ub who shares the 3D data set performs operations for using the shared 3D data set by using client terminal 10b. Service application 30 of client terminal 10b transmits a processing request to server 20 in response to an operation of user Ub. The processing request to be transmitted includes "data011" as the data ID, "usr002" as the user ID, and a use identifier ("all," etc.). The operation of 3D data system 1 in this example is the same as the operation at steps S101 to S109 described with reference to FIG. 8. At step S103, the share database as shown in FIG. 7 is referred to and "usr002" is registered in the share database as the permission ID corresponding to the user ID "usr001," and thus the processing relating to the processing request is allowed to be performed.

In addition to the share of the 3D data set, if the user of client terminal 10b receives the share of the related data, service application 30 of client terminal 10b performs various processing such as displaying the 3D model using the 3D data set received from server 20 and the edit data received through the another server. For example, if service application 30 is an application that causes an avatar to dance, the user's three-dimensional avatar is displayed on UI unit 105 based on 3D modeling data and the related data processed by processing unit 353, and a state of the dancing avatar is displayed on UI unit 105.

A situation in which the share is not authenticated in the authenticating process at step S203 in FIG. 9 is now described. For example, user Ub who has received the primary share from user Ua may attempt to share the movie of the dancing avatar of user Ua with user Uc. In this example, if the share restriction information included in the 3D data set is information indicating "only primary share allowed," the share from user Ub to user Uc is not authenticated.

Figure 10:
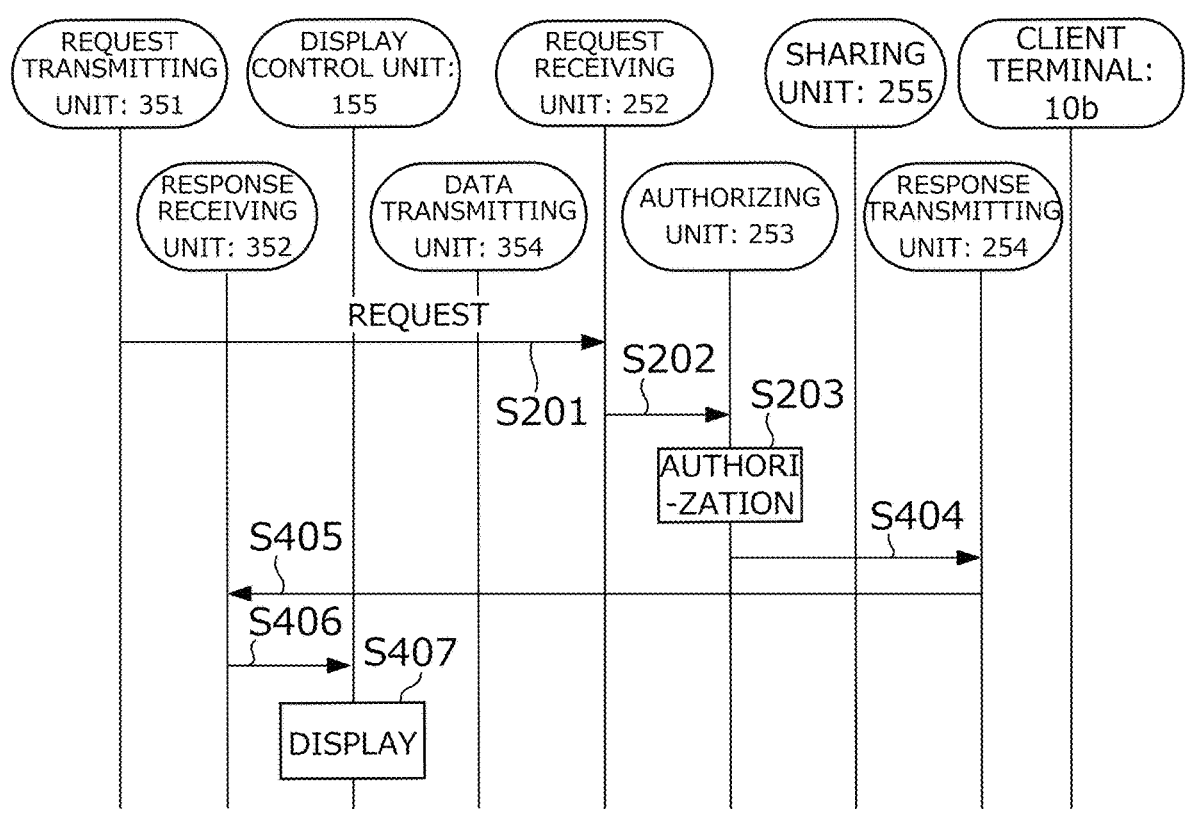
FIG. 10 is a sequence chart illustrating an operation of 3D data system 1.

FIG. 10 is a sequence chart illustrating an exemplary operation of 3D data system 1 where the share is not authenticated in the authenticating process at step S203 in FIG. 9. Processing at step S201 to step S203 shown in FIG.

10 is similar to that shown in FIG. 9. At step S203, authentication unit 253 authenticates a 3D data set from the share source user to the share destination user(s) based on the share restriction information stored in storage unit 251. If it is not authenticated to share the 3D data set from the share source user to the share destination user(s), the authentication result is transmitted to response transmitting unit 254 at step S404. At step S405, response transmitting unit 254 transmits in response to the request received at step S201 a response indicating that the share has not been authenticated. The transmitted response is received by response receiving unit 352 at step S405. The content of the received reply is notified to display control unit 155 at step S406.

At step S407, display control unit 155 performs a process such as displaying that the shares have not been authenticated. For example, a message such as "Secondary share is prohibited" is displayed. User Ub views the display result on the display control unit 155, and confirms that the share has not been performed.

2-3. Changing a User with Whom a 3D Data Set is Shared

Next, an operation of changing a user with whom a 3D data set is shared is described. In this operation example, an operation when changing a share destination of a 3D data set of user Ua from user Ub to user Uc will be described. User Ua performs an operation to change a user with whom the 3D data set is shared by using UI unit 105 of client terminal 10a. Service application 30 performs processing for sharing the 3D data set in response to the operation performed by user Ua.

Figure 11:
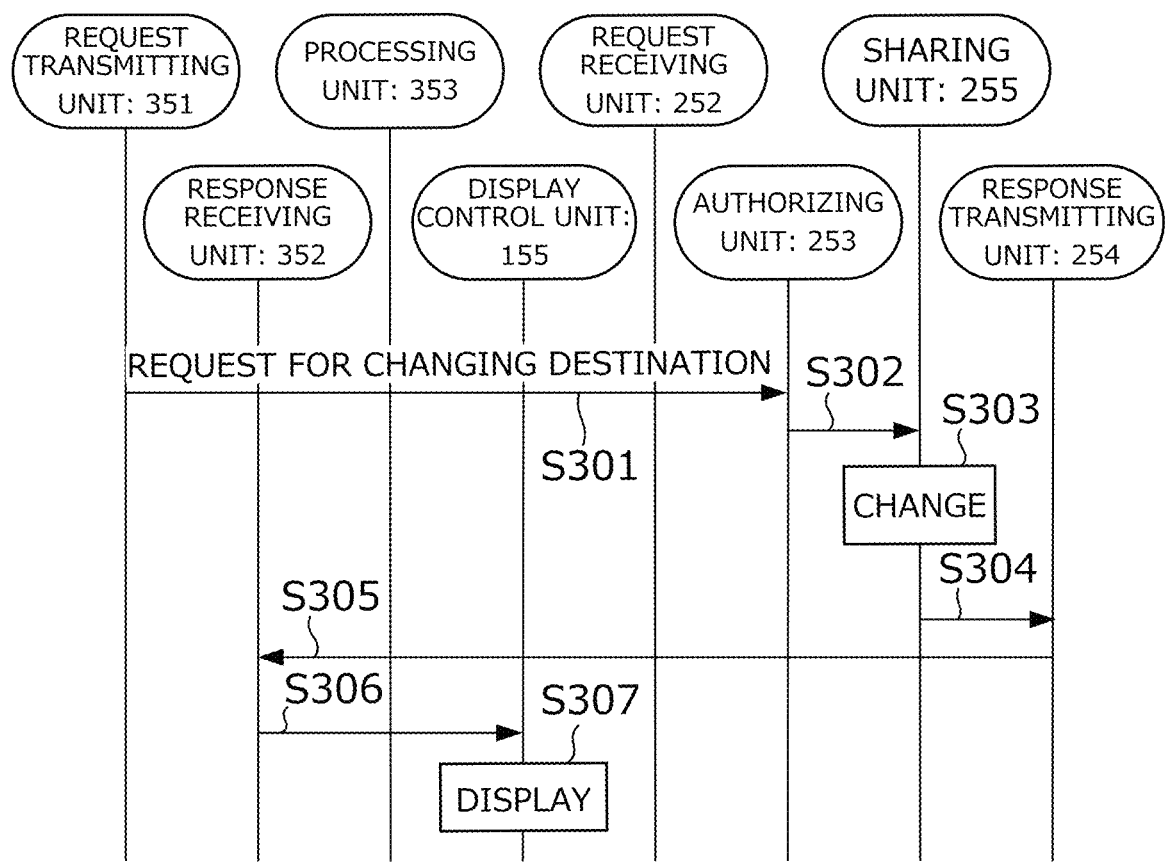
FIG. 11 is a sequence chart illustrating an operation of 3D data system 1.

FIG. 11 is a sequence chart illustrating an exemplary operation of changing a user with whom 3D data sets are shared. At step S301, request transmitting unit 351 transmits to server 20 a request for changing a destination of a 3D data set (hereinafter, a "change request"). The change request to be transmitted includes data ID of the 3D data set, user ID that identifies a share source user of the request, and a user ID that identifies a share destination user. Request receiving unit 252 receives a change request from client terminal 10 at step S301. The received change requests are provided to sharing unit 255 at step S302.

At step S303, if the user ID included in the received change request is the user ID of the user who is a subject in the data body included in the 3D data set, sharing unit 255 changes the share destination user(s) stored in storage unit 251. The result of the process performed by sharing unit 255 is provided to response transmitting unit 254 at step S304. At step S305, response transmitting unit 254 transmits a response indicating that the share destination user(s) has been changed in response to the change request received at step S301. The transmitted response is received by response receiving unit 352 at step S305. The content of the received reply is notified to display control unit 155 at step S306. At step S307, display control unit 155 performs a process such as displaying information that sharing has been authenticated.

In FIG. 7, it is assumed that a usr001, who is the subject user, changes the share destination user(s) from usr103 to usr104, who is another user. Sharing unit 255 deletes usr103 from the user list of the share destination stored in storage unit 251, and adds usr104. With respect to 3D data of usr001, since no user has been shared with usr104, sharing unit 255 deletes usr002 (2) and usr102 (3) from the list. Storage unit 251 can store the share destination user(s) and the share source user in association with each other. For example, sharing unit 255 records "user102(3, usr002)" in the table shown in FIG. 7. Thus, it is indicated that user102 is the user who received the tertiary share, and the user who was the share source user is usr002.

Another example is now described. In FIG. 7, it is assumed that a usr001, who is a subject user, changes the share destination from usr103 to usr002, who is another user. Sharing unit 255 deletes usr103 from the user list of the share destination stored in the storage unit 251. Sharing unit 255 then attempts to add a usr002 to the user list of the share destination, but usr002 is already in the list. Therefore, sharing unit 255 updates the share order and the share source user of usr002. Specifically, sharing unit 255 updates "usr002(2, usr103)" with "usr002(1, usr001)." For "usr102 (3, usr002)," since the share source user (usr002) exists in the list, sharing unit 255 updates the share order to "usr102 (2, usr002)."

Authentication unit 253 does not authenticate the processing request because no usr103 is recorded in the list even if, for example, a processing request for usr001's 3D data is received from usr103 after processing of the last example.

Here, an example is described of processing a change request from a user who is the subject, but the server 20 may receive a change request from a user who is a share destination user instead of or in addition to the user who is the subject user. In such a case, it is similarly determined whether to delete a user ID from the user list of the share destination, depending on whether there is a correspondence between the changed user and the share source and share destination.

2-4. Share Restriction Information is Updated after Sharing

After a 3D data set is shared, the share restriction data can be updated. The operation is described using a specific example.

Here, it is assumed that the share limit information of a 3D data set of user Ua is information indicating "up to tertiary shares," and that the 3D data set of user Ua is secondarily shared by user Uc. In this case, it is assumed that user Uc (who has received the secondary share) attempts to share a movie in which the avatar of user Ua is dancing with a user Ud (who has received the tertiary share). Operation of the 3D data system 1 in this example is the same as the operation at steps S201 to S212 described with reference to FIG. 9. At step S203, the share restriction information stored in storage unit 251 is referred to. Since the share limit information included in the 3D data set of user Ua that is the target of the share is "up to the tertiary share," authentication unit 253 allows the share with user Ud. That is, user Ua's 3D data set is shared from user Uc to user Ud in a cubic order.

User Ua can update the share restrictions contained in his or her 3D data set. If it is desired to update the share restriction information, user Ua performs an operation for updating the share restriction information using the UI unit 105 of the client terminal 10a. The service application 30 performs processing for updating the share restriction information in accordance with the operation of user Ua.

Figure 12:
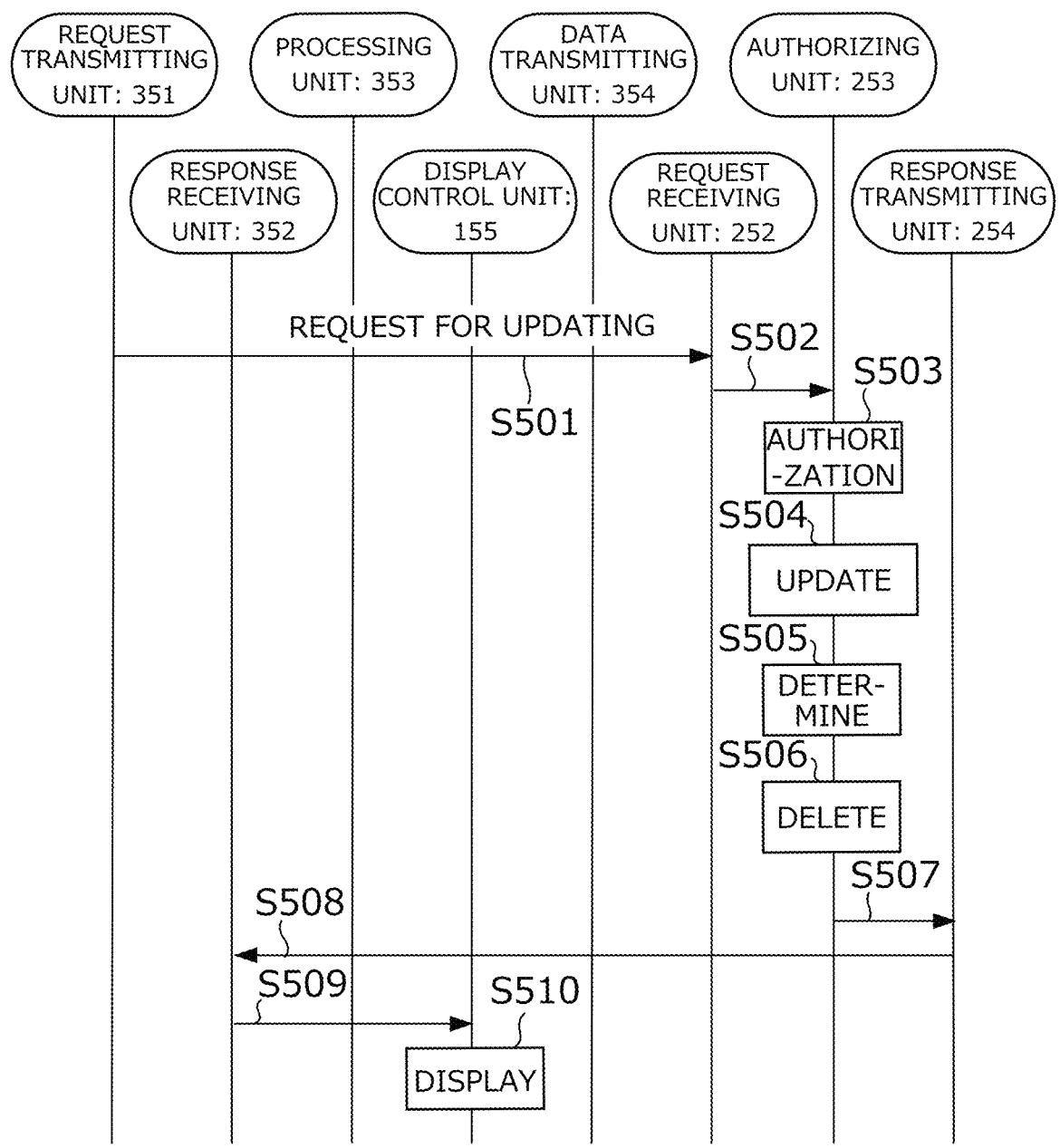
FIG. 12 is a sequence chart illustrating an operation of 3D data system 1.

FIG. 12 is a sequence chart illustrating an exemplary operation of 3D data system 1 when the share restriction information is updated. At step S501, request transmitting unit 351 of service application 30 transmits to server 20 a request for updating the share limit information. The update request includes the user ID, the data ID of the target 3D data set, and the value of the updated share limit information (e.g., "up to secondary shares," "up to primary shares," etc.). At step S501, request receiving unit 252 receives an update request from client terminal 10a. The received update request is provided to authentication unit 253 at step S502.

At step S503, authentication unit 253 authenticates updating of the share restriction information based on the data ID and the user ID stored in the share database and various information included in the update request. Here, since the user ID of user Ua and the data ID of the 3D data set are stored in correspondence with each other in the share database, authentication unit 253 allows updating of the share restriction information. Alternatively, data indicating whether updating of the share restriction information is allowed is recorded in the share database, and authentication unit 253 determines whether updating can be performed based on the data. Whether updating is allowed can be recorded and determined for each user, or can be determined according to user attributes.

If the process of updating the share restriction information is authenticated, at step S504, authentication unit 253 performs the process of updating the share restriction information. By this process, the share limit information of the 3D data set of user Ua is updated, for example, from "up to tertiary shares" to "up to secondary shares."

At step S505, authentication unit 253 determines whether the authorization ID stored in the share database includes the user ID sharing of which is no longer allowed by the updated share restriction information. For example, when the share restriction information is updated from "up to tertiary shares" to "up to secondary shares," and the authorization ID of the 3D data set including the share restriction information includes the tertiary share user ID, it is determined that the tertiary share is no longer allowed by the tertiary share user ID. In this case, at step S506, authentication unit 253 deletes from the share database "authorization ID" item of a user ID whose shares are no longer allowed. In this example, server 20 may notify the user identified by the user ID as the deletion target to the effect that 3D data set has become unavailable, such as by notifying "the process of this data has been prohibited at the request of the user who is the subject."

In this way, the user ID of the user disallowed by updating the share restriction information is deleted from the "authorization ID" item of the share database. For example, if the share limit information of 3D data set of user Ua is updated to "up to secondary shares," and user Ud is a user with a tertiary share, the user ID of user Ud is deleted from the "authorization ID" item of the share database. Further, for example, when the share restriction information is updated to "only the primary share," when user Uc is a user who has a secondary share and user Ud is a user who has a tertiary share, the user ID of user Uc and the user ID of user Ud are deleted from the item of "authorization ID" of the share database.

The result of the process by authentication unit 253 is provided to response transmitting unit 254 at step S507. At step S508, response transmitting unit 254 transmits, in response to the update request received at step S501, a response indicating that the share-limited information has been updated. The transmitted response is received by response receiving unit 352 at step S508. The content of the received reply is notified to the display control unit 155 at step S509. At step S510, display control unit 155 performs a process such as displaying that the share restriction information has been updated.

After the share limit information is updated, if the user who is no longer allowed to share tries to use the 3D data set, the process shown in FIG. 8 as described above is performed by 3D data system 1. In this case, in the authentication process at step S103 in FIG. 8, when the share database is referenced and the user ID of the user is not registered in the item "authorization ID," the process is not allowed. In this manner, after the share limit information is updated, and the user whose share is not allowed cannot use the 3D data set.

2-5. Fee Charging Operation

Next, the fee charging operation for the license fee is described. [Fee] charging unit 256 charges a license fee for the SDK based on a number of times or frequency of reception of the processing request from client terminal 10. More specifically, if charging unit 256 authenticates the processing request and then 3D data is sent to the client terminal, charging unit 256 increments the counter for calculating the license fee. Charging unit 256 charges a fee based on a value of the counter after a predetermined period of time has elapsed, for example, on the first day of each month. The specific method of charging varies depending on a contract with the user. Charging can be provided, for example, to the vendor of service application 30 or to the developer. A timing at which the charging process is performed can be, for example, periodically performed at a predetermined timing (e.g., every month), or can be performed at a timing at which the charging process is instructed by an administrator of 3D data system 1. A number of times a processing request is received can be counted, for example, by incrementing the counter stored in the storage unit 251 each time request receiving unit 252 receives a processing request from client terminal 10.

As described above, according to this embodiment, when 3D data set including a 3D model is shared, a user can control the processing of a 3D data set.

3. Modified Example

The present invention is not limited to the embodiments described above, and various modifications can be applied. Several modifications will be described below. At least some of the embodiments and two or more of the following items described in the following modification may be combined.

(1) In the above described embodiment, response transmission unit 254 of server 20 transmits all of the data body and all of the process restriction information to client terminal 10 in response to the received processing request. The process restriction information to be transmitted is not limited to the information referred to in the above embodiment. Thus, in an example instance only some process restriction information is transmitted. For example, when a value of the application identifier included in the processing request is a value indicating "only skin data," the process restriction information that restricts operation of the 3D model is not? transmitted, and only the other process restriction information is transmitted.?

(2) The order of the processes performed by 3D data system 1 is not limited to the examples described in the above embodiments. The steps of the process may be interchanged as long as no inconsistency results. The disclosure of the invention can also be provided as a 3D data process performed in 3D data system 1.

(3) In 3D data system 1, sharing of functions between client terminal 10 and server 20 is not limited to that illustrated in FIG. 2. For example, fee charging means 26 can be provided at a server different from server 20.

(4) In the above-described embodiment, a program executed by processor 101 of client terminal 10 or processor 201 of server 20 can be downloaded via a communication medium such as the Internet. The program can be provided in prerecorded format on a computer-readable recording medium such as a magnetic recording medium (magnetic tape, magnetic disk, or the like), an optical recording medium (optical disk, or the like), a magneto-optical recording medium, a semiconductor memory, or the like.

The invention claimed is:

1. A 3D data system comprising:
a server including:
a first processor; and
a first memory operably connected to the first processor; and
a client terminal including:
a second processor; and
a second memory operably connected to the second processor;
wherein the second memory stores a program for a service application that provides services using data provided from the server and that-provides a UI of the service application to a user,
the second processor executing the service application is configured to
transmit a processing request to the server in response to an instruction input via the client terminal, the processing request including a request to process a 3D data set, a data identifier for identifying the 3D data set, and a user identifier for identifying a user, the 3D data set including a data body, share restriction information, and process restriction information, the data body representing a 3D model, the share restriction information describing restrictions on a scope for sharing the data body, the process restriction information describing restrictions on the processing of the 3D model;
the first processor is configured to
store, in the second memory, a correspondence among the data identifier of the 3D data set, the user identifier of a user who is a subject in the data body included in the 3D data set, and a user identifier of another user who shares the 3D data set from the user,
receive the processing request from the service application,
authenticate processing relating to the processing request based on the correspondence stored in the memory and the share restriction information included in the 3D data set,
transmit at least a part of the data body and at least a part of the process restriction information to the service application in response to the processing request in a case that the processing is authenticated, and
the second processor executing the service application is further configured to:
receive the response from the server,
perform the processing on the data body within the restriction described by the process restriction information, and
output data which causes the client terminal to output a result of the processing performed by the second processor,
in a case that the processing request is a share request, which is a request for sharing the 3D data set with another user, the share request including a user identifier of a share source user and a user identity of a share destination user, the first processor is configured to authenticate sharing of the 3D data set from the share source user to the share destination user based on the share restriction information stored in the first memory, and the first processor is further configured to cause the first memory to store information that the 3D data set has been shared from the share source user with the share destination user in a case that sharing the 3D data set from the share source user to the share destination user is authenticated.

2. The 3D data system according to claim 1, wherein
the first processor is configured to receive a change request, which is a request for changing a user with whom the 3D data set is shared, the change request including the identifier of the 3D data set and a user identifier that identifies the source user of the request, and
in a case that the user identifier included in the change request is identical with the identifier of the user who is the subject in the data body included in the 3D data set, the first processor is configured to change the share destination user stored in the memory.

3. The 3D data system according to claim 1, wherein
the processing request includes a use identifier that identifies use of the 3D data set,
the first processor is configured to transmit a response to the service application, the response including a part of the data included in the data body selected according to the use identifier.

4. The 3D data system according to claim 1, wherein
the service application is provided by an SDK (Software Development Kit).

5. The 3D data system according to claim 4, wherein
the first processor is further configured to charge a license fee for the SDK based on a number or frequency of reception of the processing request from the service application.

6. The 3D data system according to claim 1, wherein the first processor is further configured to
edit the 3D model, and
transmit edit data representing content of the editing to another client terminal via a path different from that of the server.

7. A server comprising:
a processor; and
a memory operably connected to the processor,
wherein the processor is configured to
store, in the memory, for each of a plurality of 3D data sets, a correspondence between a user who is a subject of a 3D model and another user with whom the 3D data set is shared, each 3D data set including a data body, share restriction information, and process restriction information, the data body representing a 3D model, the share restriction information describing restrictions on sharing the data body, and process restriction information describing restrictions on processing the 3D model;
receive from a service application a processing request, which is a request to process the 3D data set, and includes a user identifier;
a authenticate the user who sent the processing request to perform the process, based on the correspondence stored in the memory and the share restriction information included in the 3D data set; and
transmit at least a part of the data body and at least a part of the process restriction information to the service application in response to the processing request in a case that the user who sent the processing request is authenticated to perform the processing, in a case that the processing request is a share request, which is a request for sharing the 3D data set with another user, the share request including a user identifier of a share source user and a user identity of a share destination user, the processor is configured to authenticate sharing of the 3D data set from the share source user to the share destination user based on the share restriction information stored in the memory, and the processor is further configured to cause the memory to store information that the 3D data set has been shared from the share source user with the share destination user in a case that sharing the 3D data set from the share source user to the share destination user is authenticated.

8. A 3D data processing method comprising:

transmitting, by a client terminal, a processing request to a server, the processing request being a request for processing a 3D data set, the 3D data set including a data body, share restriction information, and process restriction information, the data body representing a 3D model, the share restriction information describing a restriction on a scope for sharing the data body, the process restriction information describing a restriction on the processing of the 3D model, the processing request including a data identifier for identifying the 3D data set and a user identifier for identifying the user;

storing, by the server, in a memory, correspondence among the data identifier of the 3D data set, the user identifier of the user who is a subject in the data body included in the 3D data set, and the user identifier of the user who shares the 3D data set from the user;

receiving, by the server, the processing request from the service application;

authenticating, by the server, to perform the processing related to the processing request based on the correspondence stored in the memory and the share restriction information included in the 3D data set;

transmitting, by the server, in response to the processing request, at least a part of the data body and at least a part of the process restriction information to the service application, in a case that performing the processing is authenticated;

receiving, by the client terminal, the response from the server;

processing, by the client terminal, the data body within the restrictions of the process restriction information; and outputting, by the client terminal a result of the processing, in a case that the processing request is a share request, which is a request for sharing the 3D data set with another user, the share request including a user identifier of a share source user and a user identity of a share destination user, the authenticating further includes authenticating sharing of the 3D data set from the share source user to the share destination user based on the share restriction information stored in the memory, and further comprising causing, by the server, the memory to store information that the 3D data set has been shared from the share source user with the share destination user in a case that sharing the 3D data set from the share source user to the share destination user is authenticated.

* * * * *